US012358358B2

(12) United States Patent
Tanizawa

(10) Patent No.: US 12,358,358 B2
(45) Date of Patent: Jul. 15, 2025

(54) ARRANGEMENT STRUCTURE OF POWER SUPPLY UNIT IN ELECTRIC VEHICLE

(71) Applicant: MITSUBISHI JIDOSHA KOGYO KABUSHIKI KAISHA, Tokyo (JP)

(72) Inventor: Shoji Tanizawa, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 396 days.

(21) Appl. No.: 17/761,988

(22) PCT Filed: Nov. 9, 2020

(86) PCT No.: PCT/JP2020/041649
§ 371 (c)(1),
(2) Date: Mar. 18, 2022

(87) PCT Pub. No.: WO2021/145056
PCT Pub. Date: Jul. 22, 2021

(65) Prior Publication Data
US 2022/0324313 A1 Oct. 13, 2022

(30) Foreign Application Priority Data
Jan. 17, 2020 (JP) .................... 2020-006233

(51) Int. Cl.
*B60K 1/04* (2019.01)
*B62D 21/02* (2006.01)
(Continued)

(52) U.S. Cl.
CPC ............... *B60K 1/04* (2013.01); *B62D 21/02* (2013.01); *B62D 25/2009* (2013.01);
(Continued)

(58) Field of Classification Search
CPC .............. B60K 1/04; B60K 2001/0405; B60K 2001/0433; B60K 2001/0438;
(Continued)

(56) References Cited

U.S. PATENT DOCUMENTS

| 9,975,416 | B2 * | 5/2018 | Hara |
| 10,245,955 | B2 * | 4/2019 | Nakayama |
| 10,766,348 | B2 * | 9/2020 | Fukui |
| 2015/0122561 | A1 * | 5/2015 | Kashiwai ................ B60K 1/00 180/65.6 |
| 2020/0231050 | A1 | 7/2020 | Hirukawa et al. |

FOREIGN PATENT DOCUMENTS

| JP | 2014-46817 A | 3/2014 |
| JP | 2014-193692 A | 10/2014 |

(Continued)

OTHER PUBLICATIONS

International Preliminary Report on Patentability and English translation of the Written Opinion of the International Searching Authority for International Application No. PCT/JP2020/041649, dated Jul. 19, 2022.

(Continued)

*Primary Examiner* — James A Shriver, II
*Assistant Examiner* — Nicholas R. Kandas
(74) *Attorney, Agent, or Firm* — Birch, Stewart, Kolasch & Birch, LLP

(57) ABSTRACT

A total of four anchor points (5*fl*, 5*fr*, 5*rl*, and 5*rr*) are provided at front positions and rear positions of a left side member and a right side member (3*l* and 3*r*) provided on a floor (2). A drive motor (9), an inverter (10), and a transaxle (11), which serve as a drive unit (8), are mounted on the rear suspension cross member (4) supportively suspended from the respective anchor points. A junction box (21), a charger (22), and a DC-AC inverter (23), which serve as a power supply unit (20), are attached to the upper side of the floor (2). The junction box (21) relays electric power to supply it to the inverter (10). On the upper surface of the floor (2), an (Continued)

upper front floor cross member (16) is provided between the anchor points at the front position, and an upper rear floor cross member (17) is provided between the anchor points at the rear position. The power supply unit (20) is disposed between the members (16, 17).

5 Claims, 7 Drawing Sheets

(51) Int. Cl.
  *B62D 25/20* (2006.01)
  *H01M 50/249* (2021.01)
(52) U.S. Cl.
  CPC ... *H01M 50/249* (2021.01); *B60K 2001/0405* (2013.01); *H01M 2220/20* (2013.01)
(58) Field of Classification Search
  CPC ............ H01M 50/249; H01M 2220/20; B62D 21/02; B62D 25/2009
  See application file for complete search history.

(56) References Cited

FOREIGN PATENT DOCUMENTS

| JP | 2015-89806 A | | 5/2015 |
| JP | 2016-159816 A | | 9/2016 |
| JP | 2019151174 A | * | 9/2019 |
| WO | WO 2019/044295 A1 | | 3/2019 |

OTHER PUBLICATIONS

Office Action dated Mar. 8, 2023 issued in Japanese Patent Application No. 2021-570655 with an English Translation.
International Search Report for PCT/JP2020/041649 dated Dec. 22, 2020.
Written Opinion of the International Searching Authority for PCT/JP2020/041649 dated Dec. 22, 2020.
Chinese Office Action and Search Report for Chinese Application No. 202080065368.X, dated Jan. 19, 2025, with English translation of the Office Action.

* cited by examiner

ARRANGEMENT STRUCTURE OF POWER SUPPLY UNIT IN ELECTRIC VEHICLE

TECHNICAL FIELD

The present invention relates to an arrangement structure of a power supply unit in an electric vehicle.

BACKGROUND ART

Electric vehicles are equipped with various power supply units each of which controls input and output of electric power to/from a driving battery. A power supply unit is: a junction box that connects a driving battery and an electric load such as drive motor; a charger that charges the driving battery with electric power from an external power supply at a charging station and the like; a DC-AC inverter that converts DC power from a driving battery into AC power to enable home appliances to be used; or an inverter for power running control or regeneration control of the drive motor. These power supply units are connected to electric loads such as driving batteries and drive motors via power cables.

Damage to the power supply unit or disconnection of a power cable at a time of a vehicle collision may cause a short circuit; therefore, the installation position of the power supply unit and the wiring route of the power cable are carefully studied and configured.

For example, Patent Document 1 discloses a rear-wheel drive electric vehicle for which measures against a rear collision are taken. This electric vehicle has a rear suspension cross member supportively suspended from the lower side of the floor of the vehicle body to support the left and right rear wheels. In addition, this electric vehicle has a drive unit including a drive motor having an inverter and a transaxle, which are mounted on the suspension cross member to drive the rear wheels. This electric vehicle has a power supply unit including a junction box, a charger, and a DC-AC inverter, which are disposed on the lower side of the floor and above the drive unit. Here, the respective devices in the power supply unit, the inverter of the drive motor, and the driving battery are connected via a power cable. Then, the power supply unit and the drive unit are disposed inside the contour line of the rear suspension cross member in a plan view. The strong rear suspension cross member does not easily deform at a time of a rear collision, thereby preventing damage to the power supply unit and drive unit.

PRIOR ART DOCUMENT

Patent Document

Patent Document 1: Japanese Patent Laid-Open No. 2019-151174

SUMMARY OF THE INVENTION

Problems to be Solved by the Invention

The technique of Patent Document 1 is based on the condition of a vehicle body structure in which both the drive unit and the power supply unit are disposed on the rear suspension cross member on the lower side of the floor. However, there is also widely implemented a vehicle body structure in which the power supply unit is moved to the upper side of the floor. Even in such a vehicle body structure, for example, it is necessary to connect the junction box and the inverter of the drive motor with a power cable. Therefore, the power supply unit is installed near directly above the drive unit, that is, the place affected by a rear collision. The power supply unit that is separated upward from the rear suspension cross member via the floor is less likely to be protected by the rear suspension cross member. Therefore, an effective protective measures is conventionally demanded.

The present invention has been made to solve such a problem, and an object of the present invention is to provide an arrangement structure of a power supply unit in an electric vehicle so that the structure can reliably protect the power supply unit and prevent damage to the power supply unit at a time of a rear collision, in a rear-wheel drive vehicle body structure in which the power supply unit is arranged on an upper side of a vehicle body floor.

Means for Solving the Problems

In order to achieve the above object, in an arrangement structure of a power supply unit in an electric vehicle of the present invention,
the electric vehicle includes
a rear suspension cross member, supportively suspended from a total of four anchor points on a lower side of a floor of a vehicle body, for supporting left and right rear wheels via a suspension, the four anchor points being at front positions and rear positions of a pair of left and right side members, the vehicle body being provided with the pair of left and right side members extending in a front-rear direction;
a drive unit mounted on the rear suspension cross member on the lower side of the floor, and including at least a drive motor that drives the left and right rear wheels; and
a power supply unit mounted on an upper side of the floor, and including at least a junction box that relays electric power from a driving battery and supplies the electric power to the drive motor,
the arrangement structure includes:
an upper front floor cross member and an upper rear floor cross member each provided in a region, in a front-rear direction, between two anchor points at front positions of the pair of left and right side members and two anchor points at rear positions of the side members, the upper front floor cross member and the upper rear floor cross member each extending in a left-right direction on an upper surface of the floor, and
the power supply unit is disposed between the upper front floor cross member and the upper rear floor cross member in the front-rear direction (claim 1).

According to the arrangement structure of the power supply unit in the electric vehicle configured in this way, the other vehicle enters forward while deforming the rear part of the floor at a time of a rear collision, and reaches the upper rear floor cross member. The upper rear floor cross member, which forms a closed cross section with the floor, has high strength, so that forward deformation is minimized if strong force is received from another vehicle. Therefore, the power supply unit disposed on the front side of the upper rear floor cross member is prevented from being damaged.

In another aspect, an arrangement structure preferably includes a lower front floor cross member and a lower rear floor cross member each forming a closed cross section with a lower surface of the floor, and each extending in the left-right direction, wherein the lower front floor cross member has a region overlapping with the upper front floor cross member in the front-rear direction, and the lower rear floor cross member has a region overlapping with the upper rear floor cross member in the front-rear direction (claim 2).

According to the arrangement structure of the power supply unit in the electric vehicle configured in this way, the upper front floor cross member and the lower front floor cross member are integrated as a strong structure extending in the left-right direction. Similarly, the upper rear floor cross member and the lower rear floor cross member are also integrated as a strong structure extending in the left-right direction. These structures have an increased strength, which further suppresses deformation due to force received from the other vehicle at a time of a rear collision.

In yet another aspect, an arrangement structure is preferably configured such that: left and right ends of the upper front floor cross member are respectively connected to the left and right side members, and left and right ends of the upper rear floor cross member are respectively connected to the left and right side members; and left and right ends of the lower front floor cross member are respectively connected to the left and right side members, and left and right ends of the lower rear floor cross member are respectively connected to the left and right side members (claim 3).

According to the arrangement structure of the power supply unit in the electric vehicle configured in this way, both ends of the upper rear and lower rear floor cross members are connected to both ends of the upper front and lower front floor cross members via the left and right side members. They are thus connected to form a strong structure, on the floor, that forms a substantially square frame shape in a plan view. Therefore, the left and right side members and the upper front and lower front floor cross members exhibit an effect of suppressing deformation of the upper rear and lower rear floor cross members. In addition, the strong structure forming the substantially square shape is integrated with the rear suspension cross member, which is also strong and on the lower side of the structure, via the respective anchor points. The rear suspension cross member also exhibits an effect of suppressing the deformation of the upper rear and lower rear floor cross members.

In yet another aspect, an arrangement structure preferably further includes a unit cover that covers the power supply unit from above, wherein a front part of the unit cover is connected to the upper front floor cross member, and a rear part of the unit cover is connected to the upper rear floor cross member (claim 4).

According to the arrangement structure of the power supply unit in the electric vehicle configured in this way, the unit cover also exhibits an effect of suppressing the deformation of the upper rear and the lower rear floor cross members.

In yet another aspect, an arrangement structure is preferably configured such that the power supply unit includes a plurality of devices including the junction box, the unit cover includes a first unit cover disposed directly above the junction box and a second unit cover disposed directly above a device other than the junction box, and the first unit cover can be attached and detached separately from the second unit cover (claim 5).

According to the arrangement structure of the power supply unit in the electric vehicle configured in this way, the first unit cover directly above the junction box can be attached and detached separately from the second unit cover, so that the maintainability is improved.

Advantageous Effects of the Invention

According to the arrangement structure of the power supply unit in the electric vehicle of the present invention can reliably protect the power supply unit and prevent damage to the power supply unit at a time of a rear collision, in a rear-wheel drive vehicle body structure in which the power supply unit is arranged on an upper side of the vehicle body floor.

MODE FOR CARRYING OUT THE INVENTION

The following describes an embodiment of an arrangement structure of a power supply unit in an electric vehicle embodying the present invention.

Figure 1:
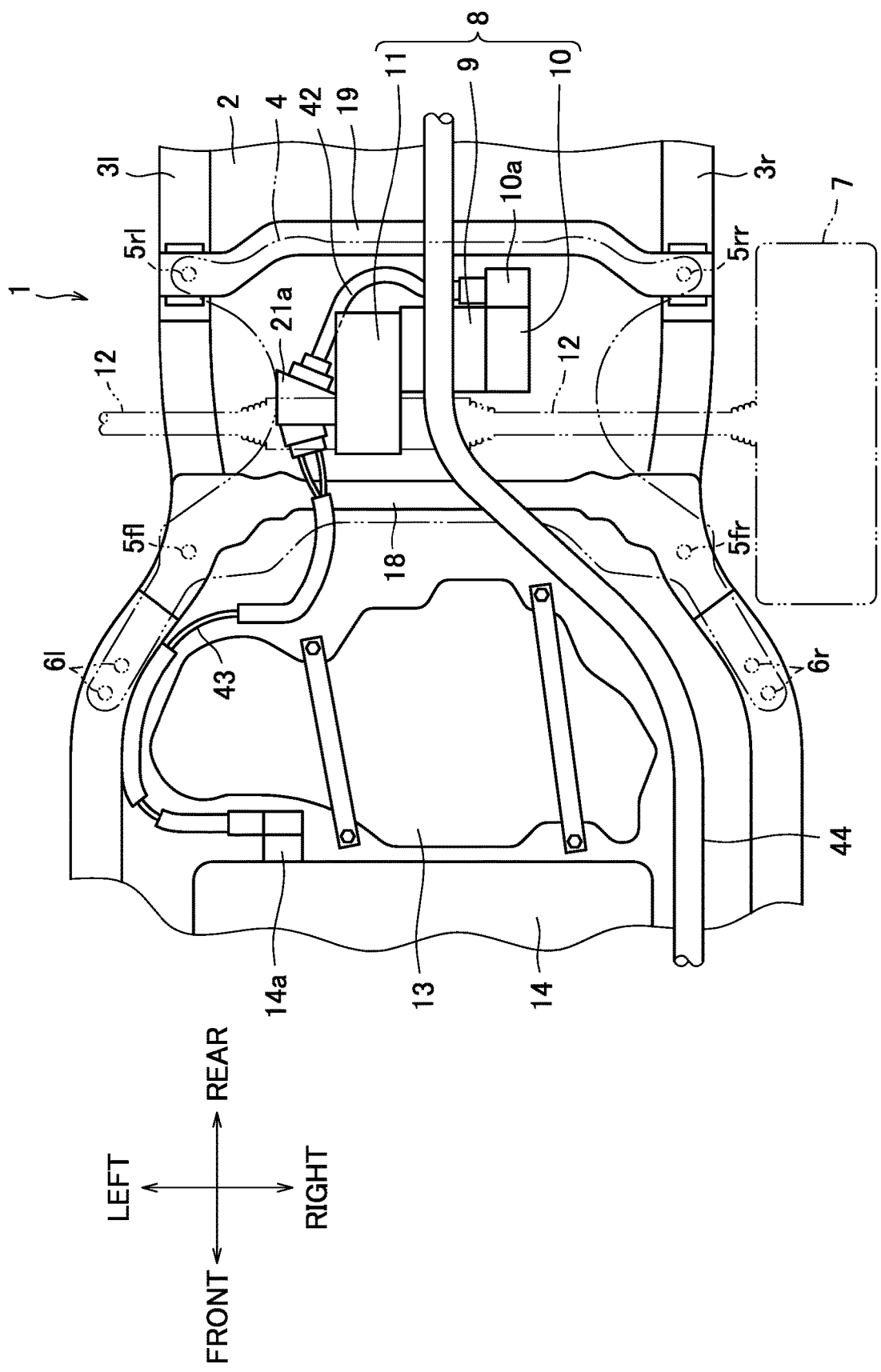
FIG. 1 is a bottom view showing a rear part of an electric vehicle of an embodiment.
Figure 2:
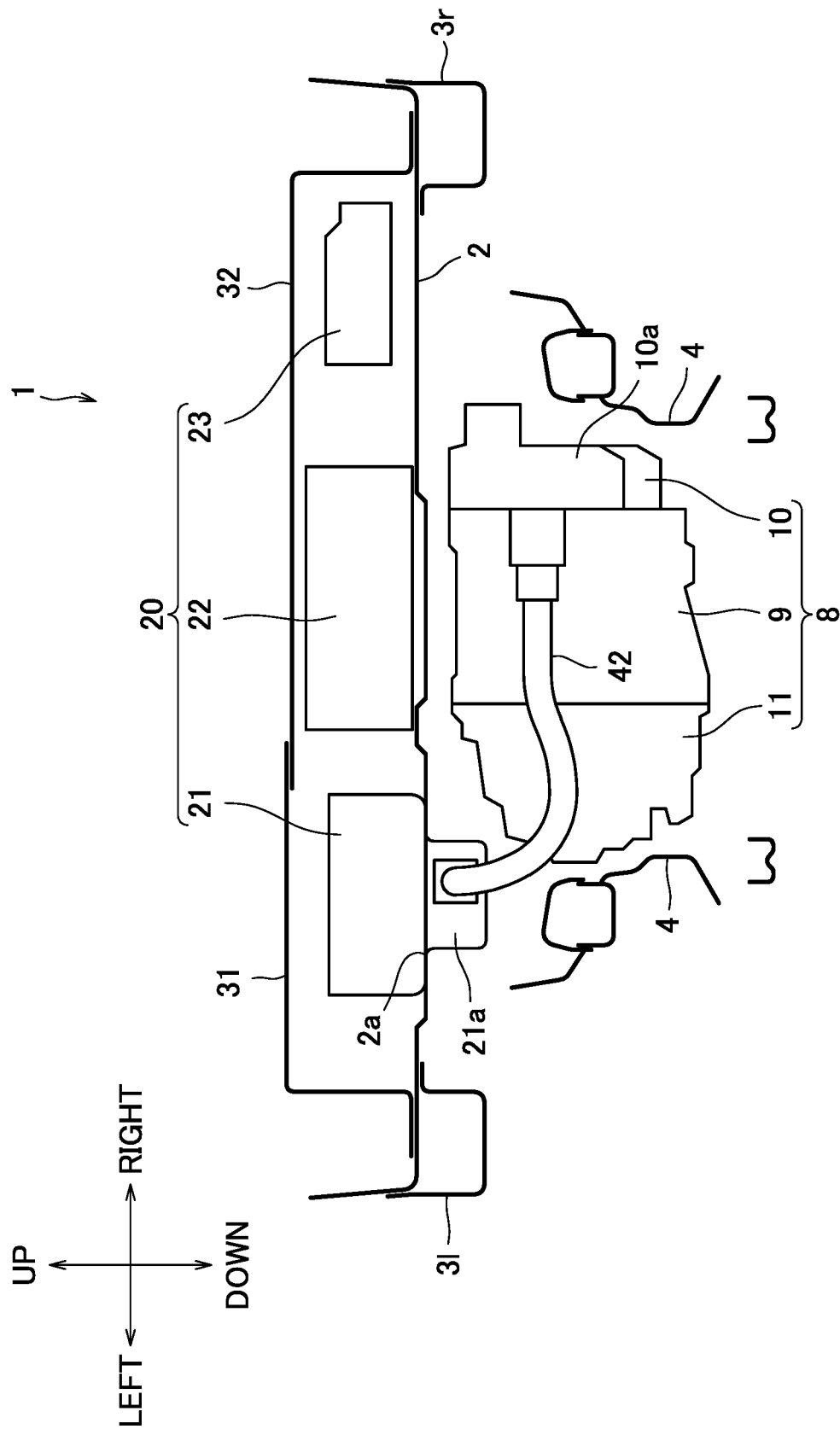
FIG. 2 is a cross-sectional view showing the rear part of the electric vehicle as seen from the rear.
Figure 3:
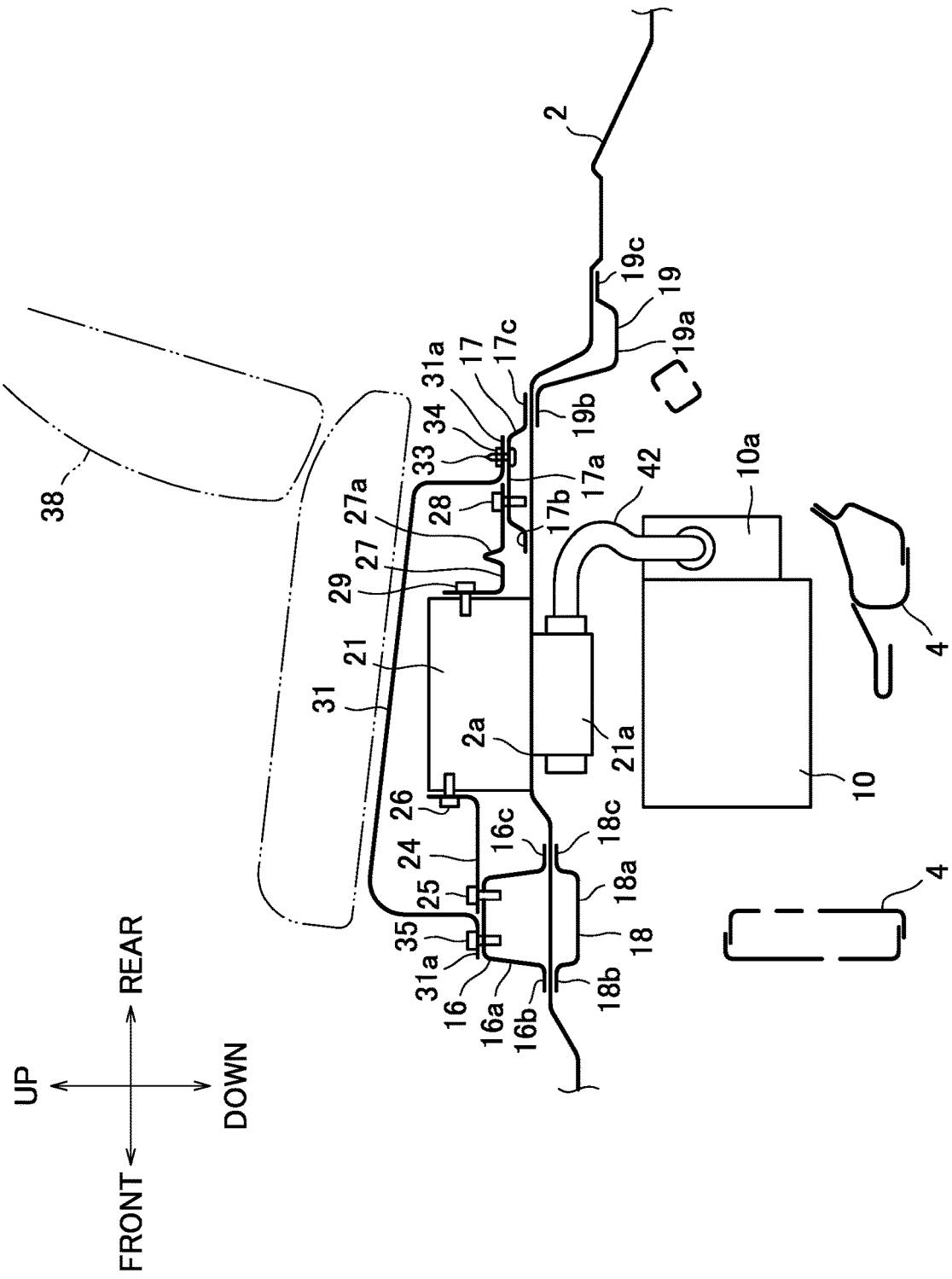
FIG. 3 is a cross-sectional view also showing the rear part of the electric vehicle as seen from the left side.

FIG. 1 is a bottom view showing a rear part of the electric vehicle of the embodiment. FIG. 2 is a cross-sectional view seen from the rear showing the rear part of the electric vehicle. FIG. 3 is a cross-sectional view seen from the left side showing the rear part of the electric vehicle. The following description expresses the front-rear, left-right, and up-down directions based on the driver in the vehicle.

The electric vehicle of the present embodiment is a hybrid vehicle 1 equipped with a drive motor 9 and an engine (not shown) to be described below as a driving power source. As shown in FIGS. 1 and 2, the lower surface of a floor 2 configuring the vehicle body is provided with a pair of left and right side members 3*l* and 3*r*. Each of the side members 3*l* and 3*r* forms a closed cross section with the floor 2 and extends in the front-rear direction.

As shown by the dashed and double-dotted line in FIG. 1, the lower side of the floor 2 has a rear suspension cross member 4 disposed thereon, and both left and right sides thereof are supportively suspended from the side members 3*l* and 3*r*. More specifically, in the plan view shown in FIG. 1, the front and rear positions of the left and right side members 3*l* and 3*r* have support mounts 5*fl*, 5*fr*, 5*rl*, and 5*rr* provided thereon. Since they correspond to a total of four anchor points of the present invention, they are also referred to as anchor points in the following description. The front left and right, and the rear left and right of the rear suspension cross member 4 are supportively suspended from the anchor points 5*fl*, 5*fr*, 5*rl*, and 5*rr*, respectively. The left and right sides of the rear suspension cross member 4 both extend forward from the anchor points 5*fl* and 5*fr* at the front position, and are respectively fastened to the left and right side members 3*l* and 3*r* by a pair of bolts 61 and 6*r*.

The left and right sides of the rear suspension cross member 4 support left and right rear wheels 7 (only the right side is shown) via double wishbone suspensions (not shown). Since the configuration of the suspension is well known, the details are not described, but the suspension includes an upper arm, a lower arm, a toe control link, a spring, and an absorber. To resist the force received from the road surface, the drive reaction force to the rear wheels 7, and the like while the hybrid vehicle 1 is driving, the rear suspension cross member 4 is made of a thick steel plate and has high strength. Further, the rear suspension cross member 4 is supported by the left and right side members 3*l* and 3*r*, which also have a high strength.

Figure 4:
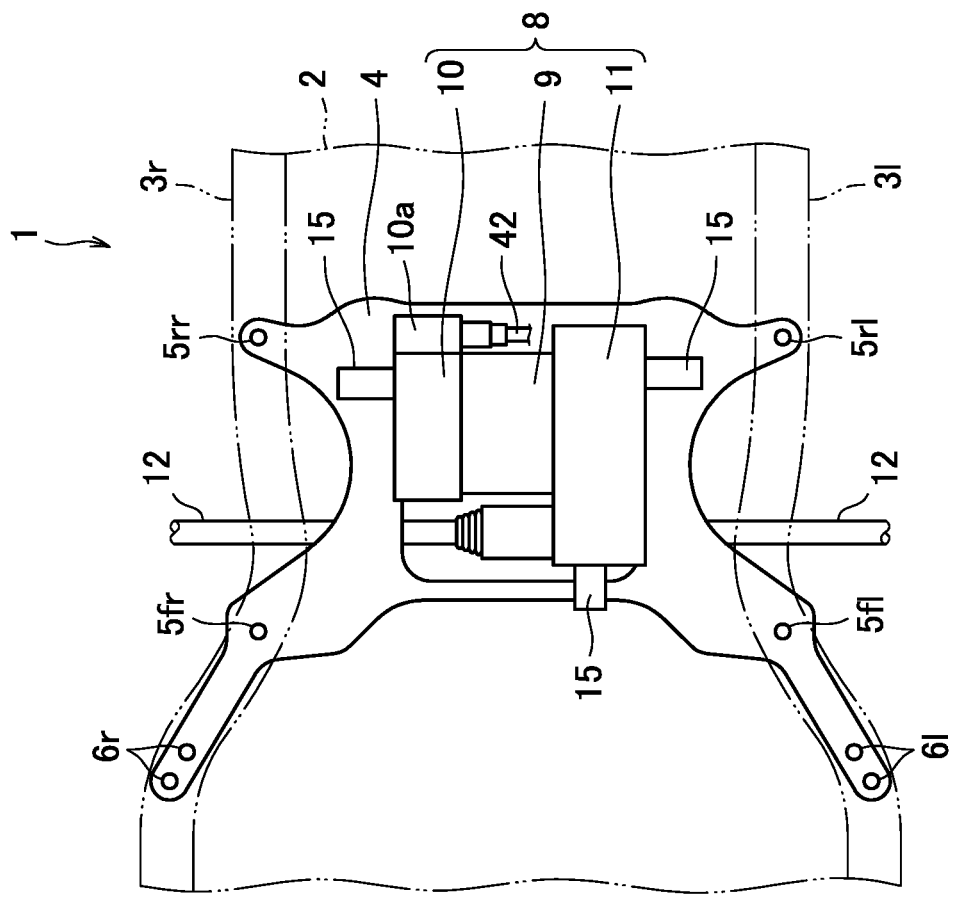
FIG. 4 is a plan view showing an arrangement of a drive unit on a rear suspension cross member.
Figure 4:
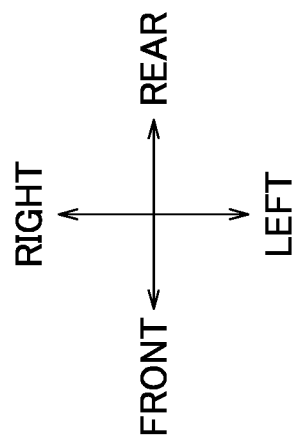
Figure 5:
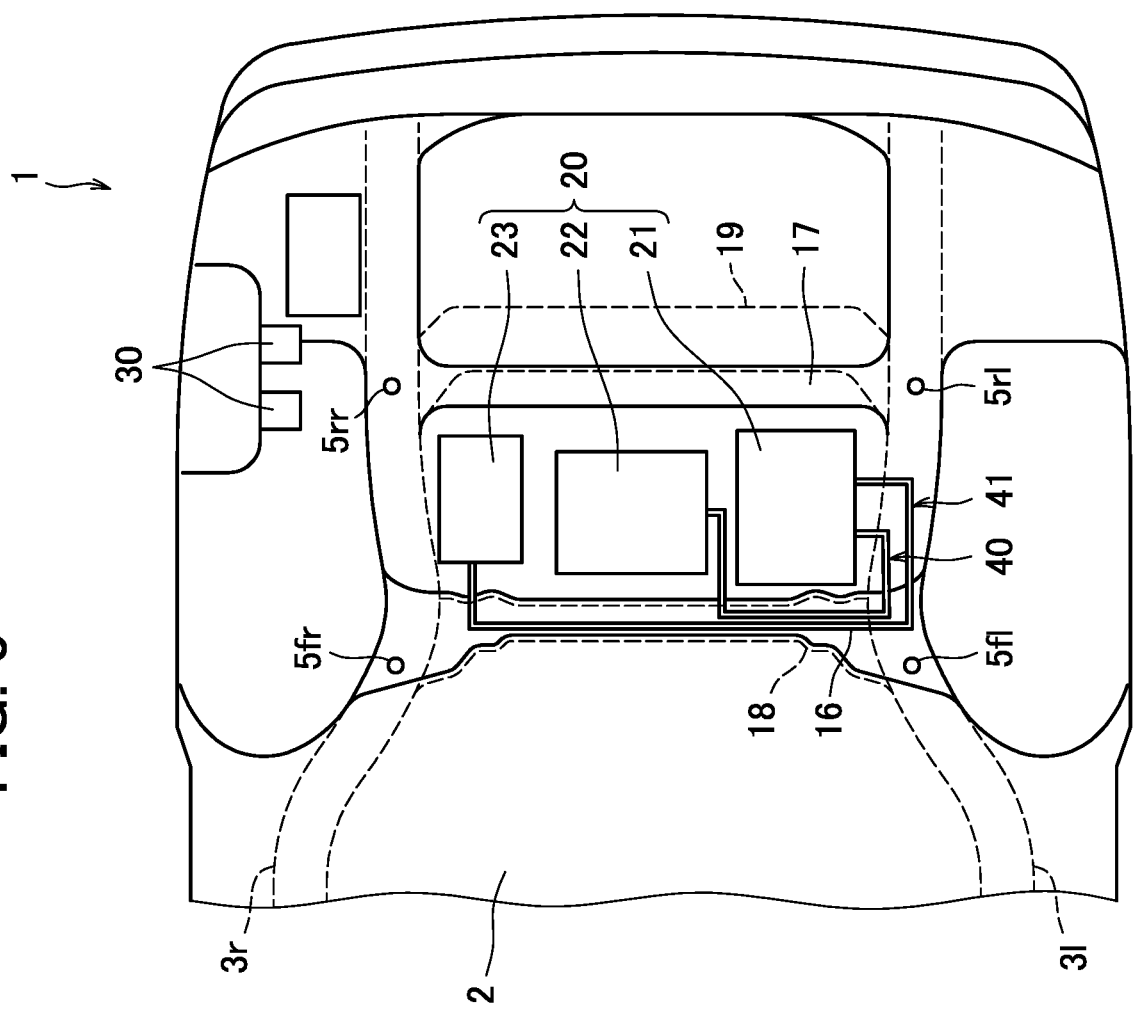
FIG. 5 is a plan view showing an arrangement of a power supply unit on a floor.
Figure 6:
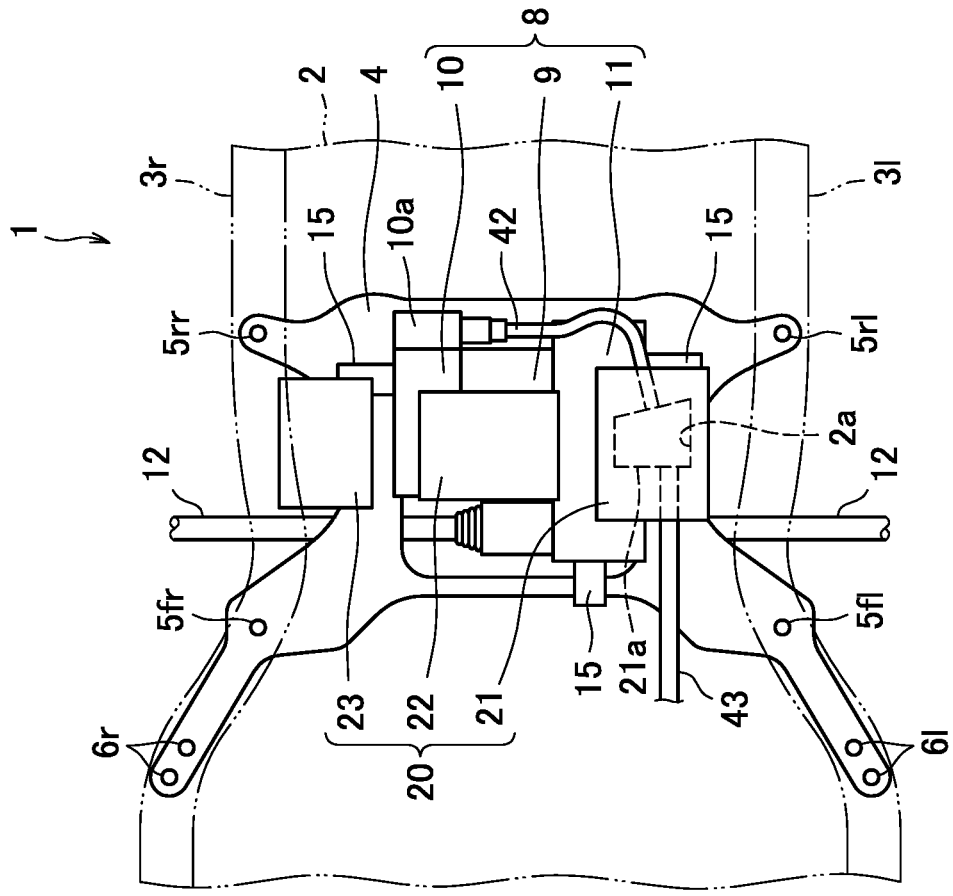
FIG. 6 is a plan view showing a positional relationship and a connection state of the power supply unit and the drive unit.
Figure 6:
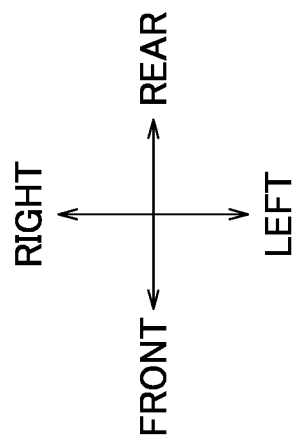

FIG. 4 is a plan view showing the arrangement of the drive unit on the rear suspension cross member 4. FIG. 5 is a plan view showing the arrangement of the power supply unit on the floor 2. FIG. 6 is a plan view showing a positional relationship and a connection state between the power supply unit and the drive unit.

As shown in FIGS. 1, 2 and 4, on the lower side of the floor 2, the rear suspension cross member 4 has a drive unit 8 including a drive motor 9; an inverter 10 integrally provided in the drive motor 9; and a transaxle 11 functioning as a speed reducer. They are mounted via a support mount 15. In the present embodiment, the transaxle 11 is arranged on the left side and the inverter 10 is arranged on the right side, in line in the left-right direction, in an arrangement sandwiching the drive motor 9. The transaxle 11 is coaxially connected to the drive motor 9 and has a shape that protrudes forward from the drive motor 9. The respective left and right sides of this protruding part are connected to the inner ends of drive shafts 12, and the respective outer ends of the drive shafts 12 are connected to the left and right rear wheels 7.

The inverter 10 is integrally provided on the right side of the drive motor 9 and has a terminal block 10*a* protruding rearward from the drive motor 9. The terminal block 10*a* has a left side surface connected to a motor-side power cable 42 to be described below. As described above, the entire region of the drive unit 8 mounted on the rear suspension cross member 4 is disposed inside the contour line of the rear suspension cross member 4 in the plan view. The front part of the rear suspension cross member 4 in the lower side of the floor 2 has a fuel tank 13 disposed thereon. The fuel tank 13 stores fuel of an engine (not shown) that is a driving power source. The front part of the fuel tank 13 has a driving battery 14 disposed thereon.

The drive motor 9 is driven and controlled by the inverter 10. For example, at a time of power running control, the DC power from the driving battery 14 is converted into three-phase AC power by the inverter 10 and supplied to the drive motor 9. Then, the rotation of the drive motor 9 is reduced in the transaxle 11 to drive the left and right rear wheels 7 via the drive shaft 12. At a time of regeneration control, the rotation of the left and right rear wheels 7 is transmitted to the drive motor 9 via the drive shaft 12 and the transaxle 11. Then, the three-phase AC power generated by the drive motor 9 is converted into DC power by the inverter 10 and charged into the driving battery 14.

As shown in FIGS. 3 and 5, the upper surface of the floor 2 is provided with upper front and upper rear floor cross members 16 and 17, and the lower surface of the floor 2 is provided with lower front and lower rear floor cross members 18 and 19. Specifically, on the upper surface of the floor 2, an upper front floor cross member 16 is provided between the left and right anchor points 5*fl* and 5*fr* at the front position. In addition, an upper rear floor cross member 17 is provided between the left and right anchor points 5*rl* and 5*rr* at the rear position. Each of them extends in the left-right direction while forming a closed cross section with the upper surface of the floor 2, and has both ends connected to the left and right side members 3*l* and 3*r*. Further, on the lower surface of the floor 2, a lower front floor cross member 18 is provided between the left and right anchor points 5*fl* and 5*fr* at the front position. In addition a lower rear floor cross member 19 is provided between the left and right anchor points 5*rl* and 5*rr* at the rear position. Each of them extends in the left-right direction while forming a closed cross section with the lower surface of the floor 2, and has both ends connected to the left and right side members 3*l* and 3*r*.

As shown in FIG. 3, the floor cross members 16 to 19 respectively include main bodies 16*a* to 19*a* each having a closed cross section with the floor 2, and flanges 16*b* to 19*b* and 16*c* to 19*c* on both front and rear sides joined to the floor 2. Then, the upper front floor cross member 16 and the lower front floor cross member 18 overlap in all the regions of the main body 16*a*, 18*a* and the flanges 16*b*, 16*c*, 18*b*, 18*c* in the front-rear direction. The positional relationship between the upper rear floor cross member 17 and the lower rear floor cross member 19 is as follows: the rear flange 17*c* of the upper rear floor cross member 17 and the front flange 19*b* of the lower rear floor cross member 19 overlap in the front-rear direction.

The upper front floor cross member 16 and the lower front floor cross member 18 have a region where they overlap in the front-rear direction with the floor 2 in between, and the upper rear floor cross member 17 and the lower rear floor cross member 19 have an region where they overlap in the front-rear direction with the floor 2 in between. As a result, they are integrated with each other and extend in the left-right direction. This increases the strength significantly as compared with the case in which they are arranged apart from each other in the front-rear direction, for example. Then, the left and right side members 3*l* and 3*r* are connected via these floor cross members 16 to 19. This forms a strong structure forming a substantially square frame shape in a plan view on the floor 2.

As shown in FIGS. 3 to 5, the floor 2 has a power supply unit 20 including a junction box 21, a charger 22, and a DC-AC inverter 23 mounted in this order from the left side. Here, the charger 22 and the DC-AC inverter 23 correspond to a plurality of devices of the present invention. As is well known, the junction box 21 is a device for connecting a driving battery 14 and various electric loads such as a drive motor 9. The charger 22 is a device that charges the driving battery 14 with electric power from an external power supply at a charging station or the like via a charging port 30. The DC-AC inverter 23 is a device that converts the DC power of the driving battery 14 into 100V AC power to enable home appliances to be used.

In short, the power supply unit 20 is mounted on the floor 2 by using the upper front and the upper rear floor cross members 16 and 17. The following describes the mounting state, illustrating the junction box 21 based on FIGS. 3 and 5. One side surface of a L-shaped front bracket 24 is fixed on the upper front floor cross member 16 by a bolt 25. The other side surface of the front bracket 24 is fixed to the front surface of the junction box 21 by bolts 26. Similarly, one side surface of a L-shaped rear bracket 27 is fixed on the upper rear floor cross member 17 by bolts 28. The other side surface of the rear bracket 27 is fixed to the rear surface of the junction box 21 by bolts 29. As a result, the front part of the junction box 21 is supported and fixed by the upper front floor cross member 16 via the front bracket 24, and the rear part thereof is supported and fixed by the upper rear floor cross member 17 via the rear bracket 27.

The rear bracket 27 has a fragile portion 27*a* forming a substantially triangular shape, which is formed by bending. At a time of a rear collision by another vehicle, the fragile portion 27*a* bends and deforms to absorb the impact. The charger 22 and the DC-AC inverter 23 are also in the same mounting state, as is not described in duplicate.

Figure 7:
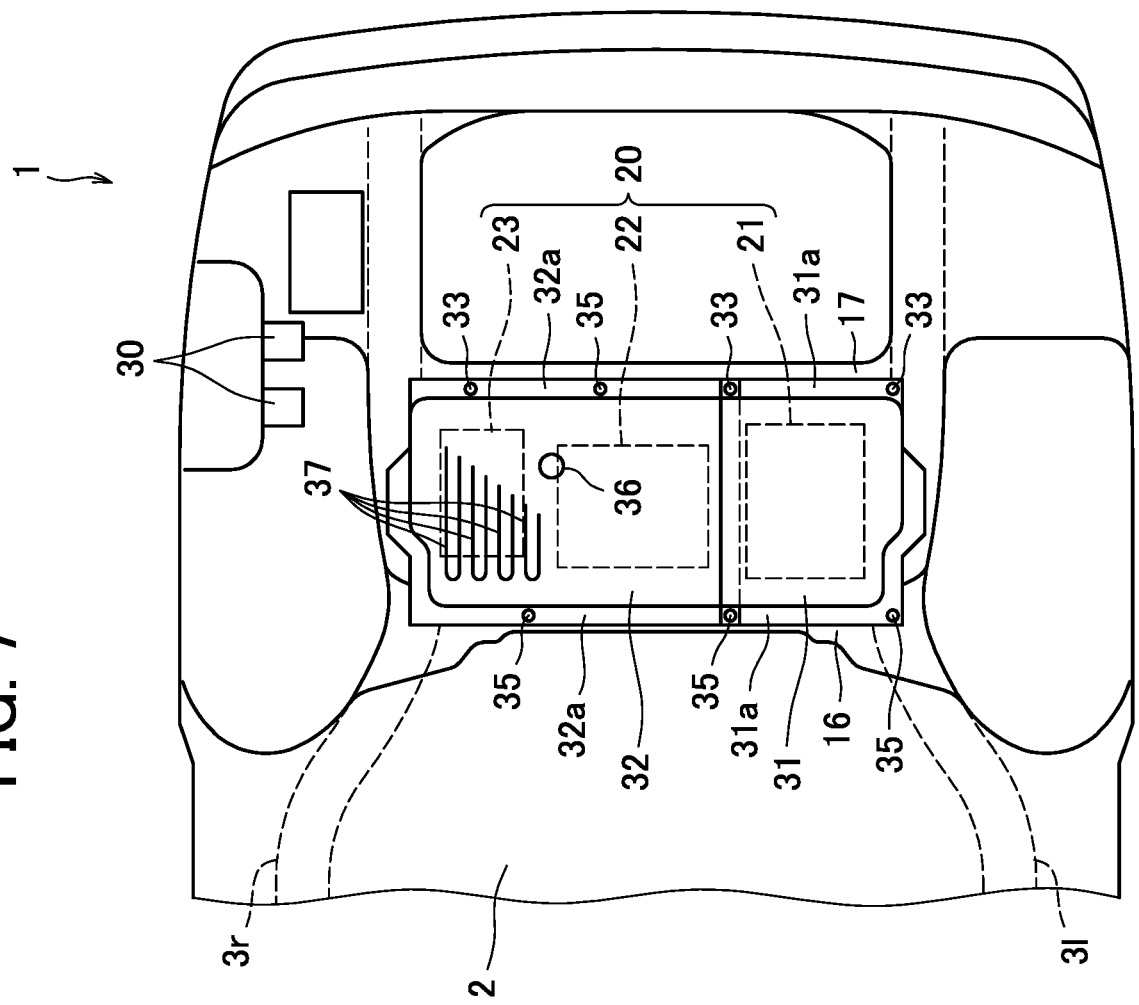
FIG. 7 is a plan view showing a relationship of the power supply unit, and a first unit cover and a second unit cover on the floor.

FIG. 7 is a plan view showing the relationship between the power supply unit 20 on the floor 2 and the first and second unit covers.

As shown in FIGS. 3 and 7, the first unit cover 31 is disposed directly above the junction box 21, and the second unit cover 32 is disposed directly above the charger 22 and the DC-AC inverter 23. The first and second unit covers 31 and 32 are adjacent to each other on the left and right. The side edge of the first unit cover 31 overlaps with the side edge of the second unit cover 32 between the junction box 21 and the charger 22. As a result, both unit covers 31 and 32 form a square box shape that opens downward as a whole. The flanges 31a and 32a formed around the unit covers 31 and 32 overlaps with the upper surfaces of the upper front and upper rear floor cross members 16 and 17 and the upper surfaces of the left and right side members 3l and 3r.

Although not shown, the flanges 31a and 32a have bolt holes penetrating therethrough at a plurality of points. Some points of the bolt holes are fastened on the upper rear floor cross member 17 by stud bolts 33 protruding from the upper surface of the upper rear floor cross member 17 and nuts 34. Further, the other points of the bolt holes are fastened to the upper surfaces of the upper front and the upper rear floor cross members 16 and 17 by bolts 35. Further, although not shown, the charger 22 has a female screw provided thereon, and the second unit cover 32 is also fastened with a bolt 36 at the point of the female screw. The number and position of the stud bolts 33, and the bolts 35 and 36 can be changed optionally.

As described above, the first and second unit covers 31 and 32 are fixed on the floor 2, and the power supply unit 20 is covered from above by these unit covers 31 and 32 and housed inside. The side edge of the first unit cover 31 overlaps with the side edge of the second unit cover 32. Therefore, only the first unit cover 31 can be attached and detached while the second unit cover 32 is still fastened to the upper surfaces of the upper front and the upper rear floor cross members 16 and 17.

Here, the reason why the stud bolts 33 are used at some of the fastening points is that, when the unit covers 31 and 32 are attached, the stud bolts 33 are first inserted into the bolt holes of the flanges 31a and 32a to position the unit covers 31 and 32, thereby facilitating the subsequent fastening work of the bolts 35 and 36. Further, the fastening point by the bolt 36 on the charger 22 is for preventing damage when a load is applied to the upper surface of the second unit cover 32 for some reason.

The first and second unit covers 31 and 32 are manufactured by bending a steel plate, and are formed with a large number of ribs 37 extending in the front-rear direction (partially shown in FIG. 7) to increase the strength. Then, the upper front and the upper rear floor cross members 16 and 17 are connected to each other via these first and second unit covers 31, 32. This restricts relative positional displacement of both floor cross members 16 and 17 in the front-rear direction.

Directly above the unit covers 31 and 32, a third row seat 38 is disposed and the front and rear parts thereof are mounted on the floor 2 via a bracket (not shown). The first and second unit covers 31 and 32 block electromagnetic waves radiated from the power supply unit 20 in consideration of the occupants seated in the third row seat 38. The first and second unit covers 31 and 32 also protect the power supply unit 20 from juice and the like spilled by the occupants. The first and second unit covers 31 and 32 also block running noise and the like from the floor 2 by a sound absorbing material (not shown) attached to the inner surface thereof.

The reason why only the first unit cover 31 can be attached and detached separately from the second unit cover 32 is based on the following demand.

The charger 22 and DC-AC inverter 23 do not require maintenance unless they break down. On the contrary, the junction box 21 often requires maintenance, such as replacement of a built-in fuse or inspection of a connection point of a power cable to be described below. If the first and second unit covers 31 and 32 are integrated, the integrated cover would have a larger size resulting in difficult handling, and would have a greater number of bolts to be attached and detached, resulting in complicated handling. Therefore, only the first unit cover 31 can be attached and detached separately from the second unit cover 32, and this can improve the maintainability of the junction box 21.

As shown in FIG. 5, there is a power cable 40 connecting the junction box 21 and the charger 22 on the upper side of the floor 2 and on the front side of the power supply unit 20. The power cable 40 is connected to a side surface of the junction box 21 facing the vehicle outside and a side surface of the charger 22 facing the junction box 21. Similarly, the adjacent power cable 41 connecting the junction box 21 and the DC-AC inverter 23 is connected to the side surface of the junction box 21 facing the vehicle outside and the front surface of the DC-AC inverter 23. As shown in FIGS. 2, 3 and 6, the lower surface of the junction box 21 is provided with a terminal block 21a that is fitted into a through hole 2a formed in the floor 2 and protrudes downward. One end of the motor-side power cable 42 is connected to the rear surface of the terminal block 21a, and the other end is connected to the left side surface of the terminal block 10a of the inverter 10. As can be seen from FIG. 6, not only the drive unit 8 but also the motor-side power cable 42 is disposed inside the contour line of the rear suspension cross member 4 in a plan view.

Further, since the junction box 21 is arranged on the leftmost side in the power supply unit 20, the terminal block 21a is also located on the left side in the vehicle width as shown in FIG. 1. Then, according to the position of the terminal block 21a in the left-right direction, the terminal block 14a of the driving battery 14 is also provided on the left side in the vehicle width, and one end of a battery-side power cable 43 is connected thereto. The battery-side power cable 43 is routed on the left side of the fuel tank 13 so as to bypass the fuel tank 13, and the other end thereof is connected to the terminal block 21a of the junction box 21.

The junction box 21 relays electric power to be exchanged between: the driving battery 14; and the charger 22, the DC-AC inverter 23, and the inverter 10 of the drive motor 9. For example, the DC power from the driving battery 14 is supplied to the DC-AC inverter 23 via the junction box 21, converted into 100V AC power, and used for operating home appliances. Further, the AC power supplied from an external power supply at a charging station or the like is converted into DC power by the charger 22, and is charged in the driving battery 14 via the junction box 21. Further, at a time of power running control of the drive motor 9, the DC power of the driving battery 14 is supplied to the inverter 10 via the junction box 21, converted into three-phase AC power, and supplied to the drive motor 9. On the other hand, at a time of regeneration control, the three-phase AC power generated by the drive motor 9 is converted into DC power by the inverter 10 and charged in the driving battery 14 via the junction box 21.

On the other hand, an engine (not shown), as a driving power source, is mounted on the front side of the driving battery 14 of the vehicle body. The exhaust pipe 44 of the engine is routed rearward on the right side of the driving battery 14 and the fuel tank 13 to bypass them, and is connected to a silencer and an exhaust gas purification device (not shown) via the lower side of the drive motor 9.

Next, the following describes an arrangement structure of the power supply unit 20, which is a feature of the present invention, and a protective effect for the power supply unit 20 at a time of a rear collision.

As can be seen from FIGS. 3 and 5, the entire power supply unit 20 is disposed between the upper front floor cross member 16 and the upper rear floor cross member 17 in the front-rear direction. Specifically, the front surface of the entire power supply unit 20 is located in rear of the rear edge of the upper front floor cross member 16, and the rear surface of the entire power supply unit 20 is located in front of the front edge of the upper rear floor cross member 17. Note that the positional relationship between: the power supply unit 20; and the floor cross members 16 and 17 or the side members 3*l* and 3*r* is not limited to the above. For example, the front surface and the rear surface of the power supply unit 20 may overlap with the main bodies 16*a* and 17*a* forming the closed cross sections of the floor cross members 16 and 17.

At a time of a rear collision, the other vehicle moves forward into the rear part of the floor 2 while deforming there and reaches the upper rear floor cross member 17. The upper rear floor cross member 17 forming a closed cross section with the floor 2 has a certain degree of strength. This would further suppress a forward deformation, for example, forward bending deformation, if the upper rear floor cross member 17 receives strong force from the other vehicle. This can prevent damage to each device of the power supply unit 20 disposed on the front side of the upper rear floor cross member 17. In addition, this can prevent, for example, disconnection of the motor-side power cable 42 connected to the terminal block 21*a* of the junction box 21.

Further, as in the positional relationship with respect to the upper front and upper rear floor cross members 16 and 17, the entire power supply unit 20 is disposed between the lower front floor cross member 18 and the lower rear floor cross member 19 in the front-rear direction. Specifically, the front surface of the entire power supply unit 20 is located in rear of the rear edge of the lower front floor cross member 18, and the rear surface of the entire power supply unit 20 is located in front of the front edge of the lower rear floor cross member 19.

Moreover, the upper front floor cross member 16 has the main body 16*a* and the flanges 16*b* and 16*c*, the regions of which respectively overlap the regions of the main body 18*a* and the flanges 18*b* and 18*c*, which the lower front floor cross member 18 has, in the front-rear direction. For the upper rear floor cross member 17 and the lower rear floor cross member 19, the flanges 17*c* and 19*b* overlap in the front-rear direction. Thus, each of the overlapped structures is integrated as a strong structure that extends in the left-right direction.

In this way, the upper rear and lower rear floor cross members 17 and 19 are integrated to increase the strength. This can further suppress deformation due to the force received from the other vehicle at a time of a rear collision, and achieve further protection of the power supply unit 20 and the like.

In addition, the left and right ends of the upper rear and lower rear floor cross members 17 and 19 are connected to the left and right ends of the upper front and lower front floor cross members 16 and 18 via the left and right side members 3*l* and 3*r*. This forms a strong structure forming a substantially square frame shape in a plan view on the floor 2. Therefore, to deform the upper rear and lower rear floor cross members 17 and 19 by the force received from the other vehicle at a time of a rear collision, it is necessary to deform these left and right side members 3*l* and 3*r* and the upper front and lower front floor cross members 16 and 18. In other words, the left and right side members 3*l* and 3*r*, and the upper front and lower front floor cross members 16 and 18 function for suppressing the deformation of the upper rear and lower rear floor cross members 17 and 19. This allows achieving further protection of the power supply unit 20 and the like.

In addition, the upper front and upper rear floor cross members 16 and 17 are connected to each other via the first and second unit covers 31 and 32 having sufficient strength. Therefore, these unit covers 31 and 32 also function for suppressing deformation of the rear floor cross members 17 and 19, which also contributes to the protection of the power supply unit 20 and the like.

On the other hand, the left and right ends of the upper front and the lower front floor cross members 16 and 18 are connected to the front left and front right of the rear suspension cross member 4 via the anchor points 5*fl* and 5*fr* at the front positions on the left and right side members 3*l* and 3*r*. Similarly, the left and right ends of the upper rear and lower rear floor cross members 17 and 19 are connected to the rear left and rear right of the rear suspension cross member 4 via the anchor points 5*rl* and 5*rr* at the rear positions on the left and right side members 3*l* and 3*r*. As a result, each floor cross member 16 to 19 and the left and right side members 3*l* and 3*r* form a substantially square-shaped strong structure. This structure has the rear suspension cross member 4 underneath, which is also strong, integrated therewith via the respective anchor points 5*fl*, 5*fr*, 5*rl*, and 5*rr*. Therefore, at a time of a rear collision, the rear suspension cross member 4 with high strength prevents the other vehicle from entering the front. In addition, the rear suspension cross member 4 functions to suppress forward positional displacement of the left and right ends of the upper rear and lower rear floor cross members 17 and 19 via the respective anchor points 5*fl*, 5*fr*, 5*rl*, and 5*rr*. Here, the forward positional displacement means a forward deformation of rear floor cross members 17 and 19. This point also contributes to the protection of the power supply unit 20 and the like.

Further, as shown in FIGS. 1 and 3, in the present embodiment, the drive unit 8 is also disposed between the front floor cross members 16 and 18 and the rear floor cross members 17 and 19 in the front-rear direction, like the power supply unit 20. In addition, the drive unit 8 is disposed inside the contour line (shown by the dashed and double-dotted line in FIG. 1) of the rear suspension cross member 4 located on the lower side. Therefore, at a time of a rear collision with the other vehicle, the floor cross members 16 to 19, the left and right side members 3*l* and 3*r*, and the rear suspension cross member 4 exhibit the same protective effect as in the case of the power supply unit 20, as is not described in duplicate. This can prevent damage to the drive unit 8 including the motor-side power cable 42.

Although the description of the embodiment is completed above, the aspect of the present invention is not limited to this embodiment. For example, the above embodiment is illustrated as an arrangement structure of the power supply unit 20 in the hybrid vehicle 1. However, the embodiment can be changed optionally for any electric vehicle equipped with the power supply unit 20, and for example, the embodiment may be applied to an electric vehicle equipped with a motor as a driving power source.

Further, in the above embodiment, the drive unit has a drive motor 9, an inverter 10 and a transaxle 11 disposed on the rear suspension cross member 4, and a power supply unit 20 has a junction box 21, a charger 22, and a DC-AC inverter 23 disposed on the upper side of the floor 2. However, the types and arrangements of them are not limited to this. For example, the arrangement of the drive motor 9, the inverter 10, and the transaxle 11 may be changed, or the inverter 10 may be disposed on the upper side of the floor 2 as one device of the power supply unit 20.

EXPLANATION OF REFERENCE SIGNS 1 electric vehicle
2 floor
3l, 3r side members
4 rear suspension cross member
5fl, 5fr, 5rl, 5rr anchor points
7 rear wheel
8 drive unit
9 drive motor
14 driving battery
16 upper front floor cross member
17 upper rear floor cross member
18 lower front floor cross member
19 lower rear floor cross member
20 power supply unit
21 junction box
22 charger (a plurality of devices)
23 DC-AC inverter (a plurality of devices)
31,32 unit cover

The invention claimed is:

1. An arrangement structure of a power supply unit in an electric vehicle,
the electric vehicle including
a rear suspension cross member, supportively suspended from a total of four anchor points on a lower side of a floor of a vehicle body, for supporting left and right rear wheels via a suspension, the four anchor points being at front positions and rear positions of a pair of left and right side members, the vehicle body being provided with the pair of left and right side members extending in a front-rear direction;
a drive unit mounted on the rear suspension cross member on the lower side of the floor, and including at least a drive motor that drives the left and right rear wheels; and
the power supply unit mounted on an upper side of the floor, and including at least a junction box that relays electric power from a driving battery and supplies the electric power to the drive motor,
the arrangement structure comprising:
an upper front floor cross member and an upper rear floor cross member each provided in a region, in a front-rear direction, between two anchor points at front positions of the pair of left and right side members and two anchor points at rear positions of the side members, the upper front floor cross member and the upper rear floor cross member each extending in a left-right direction on an upper surface of the floor,
wherein the power supply unit is disposed in a region between the two anchor points at the front positions and the anchor points at the rear positions in the front-rear direction and between the upper front floor cross member and the upper rear floor cross member in the front-rear direction, and the power supply unit is fixed to at least one of the upper front floor cross member and the upper rear floor cross member.

2. The arrangement structure of the power supply unit in the electric vehicle according to claim 1, the arrangement structure further comprising:
a lower front floor cross member and a lower rear floor cross member each forming a closed cross section with a lower surface of the floor, and each extending in the left-right direction,
wherein the lower front floor cross member has a region overlapping with the upper front floor cross member in the front-rear direction, and
the lower rear floor cross member has a region overlapping with the upper rear floor cross member in the front-rear direction.

3. The arrangement structure of the power supply unit in the electric vehicle according to claim 2, wherein
left and right ends of the upper front floor cross member are respectively connected to the left and right side members, and left and right ends of the upper rear floor cross member are respectively connected to the left and right side members; and left and right ends of the lower front floor cross member are respectively connected to the left and right side members, and left and right ends of the lower rear floor cross member are respectively connected to the left and right side members.

4. The arrangement structure of the power supply unit in the electric vehicle according to claim 1, further comprising:
a unit cover that covers the power supply unit from above,
wherein a front part of the unit cover is connected to the upper front floor cross member, and a rear part of the unit cover is connected to the upper rear floor cross member.

5. The arrangement structure of the power supply unit in the electric vehicle according to claim 4, wherein
the power supply unit includes a plurality of devices including the junction box,
the unit cover includes a first unit cover disposed directly above the junction box and a second unit cover disposed directly above a device other than the junction box, and
the first unit cover can be attached and detached separately from the second unit cover.

\* \* \* \* \*